United States Patent
Sinivaara

(10) Patent No.: US 8,787,965 B2
(45) Date of Patent: Jul. 22, 2014

(54) SERVICE DISCOVERY IN A WIRELESS COMMUNICATION SYSTEM

(75) Inventor: Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 1292 days.

(21) Appl. No.: 10/575,275

(22) PCT Filed: Nov. 21, 2003

(86) PCT No.: PCT/FI03/00896

§ 371 (c)(1),
(2), (4) Date: Apr. 11, 2006

(87) PCT Pub. No.: WO2005/051019

PCT Pub. Date: Jun. 2, 2005

(65) Prior Publication Data

US 2007/0135159 A1    Jun. 14, 2007

(51) Int. Cl.
 *H04M 1/00* (2006.01)
(52) U.S. Cl.
 USPC .................................................... 455/552.1
(58) Field of Classification Search
 CPC ........ H04W 4/24; H04W 36/36; H04W 60/04
 USPC ............ 455/41.2, 552.1, 412.1, 414.1, 412.2, 455/557, 574
 See application file for complete search history.

(56) References Cited

U.S. PATENT DOCUMENTS

| 6,697,415 | B1 * | 2/2004 | Mahany ........................ 375/130 |
| 6,957,068 | B2 * | 10/2005 | Hutchison et al. ......... 455/435.2 |
| 7,058,423 | B1 * | 6/2006 | Ahmavaara ................ 455/552.1 |
| 7,065,367 | B2 * | 6/2006 | Michaelis et al. ......... 455/452.2 |
| 7,430,602 | B2 * | 9/2008 | Babbar et al. ................. 709/227 |
| 7,460,856 | B2 * | 12/2008 | Sundberg ...................... 455/411 |
| 7,471,659 | B2 * | 12/2008 | Huang et al. .................. 370/335 |
| 2002/0059434 | A1 * | 5/2002 | Karaoguz et al. ............ 709/228 |
| 2003/0211862 | A1 * | 11/2003 | Hutchison et al. ......... 455/552.1 |
| 2004/0077353 | A1 * | 4/2004 | Mahany ........................ 455/448 |
| 2004/0082327 | A1 * | 4/2004 | Kim et al. ................. 455/435.2 |
| 2004/0116140 | A1 * | 6/2004 | Babbar et al. ................. 455/517 |
| 2005/0097087 | A1 * | 5/2005 | Punaganti Venkata et al. ... 707/3 |
| 2006/0084417 | A1 * | 4/2006 | Melpignano et al. ......... 455/418 |
| 2006/0265491 | A1 * | 11/2006 | Litwin .......................... 709/224 |

FOREIGN PATENT DOCUMENTS

| EP | 1 257 141 | 11/2002 |
| WO | WO 0103454 A1 * | 1/2001 |
| WO | WO 01/58190 | 8/2001 |
| WO | WO 02/01807 | 1/2002 |

* cited by examiner

*Primary Examiner* — Ankur Jain
(74) *Attorney, Agent, or Firm* — Squire Sanders (US) LLP

(57) ABSTRACT

The invention relates to a method for discovering services for a wireless multimode terminal with a plurality of radio interfaces. In order to improve the efficiency of a wireless multimode terminal in terms of power consumption and user-friendliness, an indication is sent to a multimode terminal in the mobile network, the indication indicating that services may be locally available for the multimode terminal via at least one short-range wireless network. The indication is received in the multimode terminal, and information is collected, based on the indication, about services available via at least one short-range wireless network. Based on the information collected, a service list is then compiled, the list describing at least one service available locally in one or more short-range wireless networks.

29 Claims, 2 Drawing Sheets

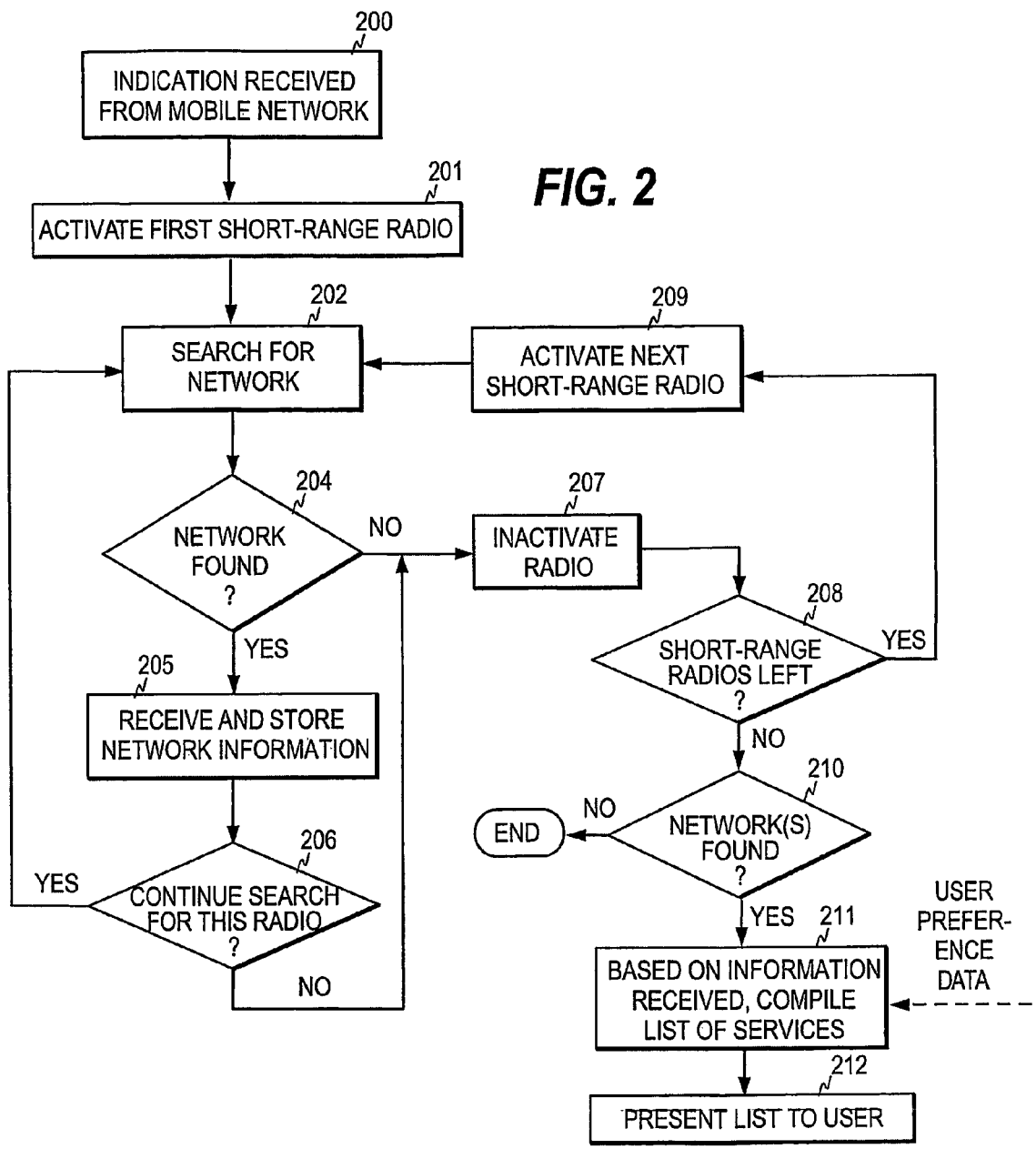

SERVICE DISCOVERY IN A WIRELESS COMMUNICATION SYSTEM

FIELD OF THE INVENTION

The invention relates to service discovery in a wireless communication system comprising a mobile network.

BACKGROUND OF THE INVENTION

The current development towards truly mobile computing and networking has brought on the evolvement of various access technologies that also provide the users with access to service providing networks, such as the Internet, when they are outside their own home network. At present, wireless Internet access is typically based on either short-range wireless systems or mobile networks, or both.

Short-range wireless systems have a typical range of about one hundred meters or less. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of 10 to 100 Mbps and have a longer range, which requires greater power consumption.

Wireless LAN systems are typically extensions of a wired network, providing mobile users with wireless access to the wired network. Examples of wireless local area network technology include the IEEE 802.11a, which is designed for the 5 GHz unlicensed band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz unlicensed band.

So-called multimode terminals are also becoming more and more common. Having the terminal provided with radio technologies according to multiple connectivity standards, the user can choose the network type most suitable in each case. However, a drawback related to the selection of the network through which the services are accessed is that the short-range wireless systems are available only locally in limited geographical areas, whereby a larger area, such as a city, may include a number of distinct service areas, each having its own characteristics according to the standard of connectivity used.

International Patent Application WO 02/01807 discloses a method for controlling and managing wireless network access in a wireless multi-standard environment. In this method, the terminal sequentially sends and/or scans for network polling information to determine whether the terminal is within range of a supported network. When one or more networks have been detected, a decision is made whether to connect to a detected network. The decision to connect to a particular network can be made on various grounds and the user may also be queried to decide whether to connect to a particular network. By a method like this, the network may be selected from those available at any given time, based on which is the best one in terms of certain "access criteria", such as the quality of service, the data rate, or the price.

Another drawback of the above network environments relates to power consumption of the terminals. In order to detect supported networks in a communication environment comprising discrete and geographically confined access areas, the terminal should frequently search for the networks with which communications may be established. Since the terminal must frequently be in a power-consuming state, a lot of power is consumed for the search only.

Still another drawback of the current multimode network environment relates to the user-friendliness of the access management. When multiple radio technologies are integrated into one terminal, operating the different radio technologies becomes easily too technical for an average user. Therefore, new mechanisms are needed by which the technologies can be hidden from the user while simultaneously enabling easy access to local services when supported networks are available.

The present invention seeks to accomplish a solution by means of which the above drawbacks may be alleviated or eliminated.

SUMMARY OF THE INVENTION

The present invention seeks to devise a new mechanism for improving the efficiency of a wireless multimode terminal in terms of power consumption and user-friendliness.

In the present invention, a mobile network is utilized to indicate to a multimode terminal that the geographical area where the terminal is currently located may include alternative technologies for accessing services, i.e. short-range wireless systems. When the terminal receives this indication, it starts to collect information about such systems or services. In one embodiment of the invention, the collection is implemented so that the terminal activates at least one of its short-range radio(s) to search for networks (i.e. access points) compatible with the said at least one short-range radio. The short-range radios activated depend on the content of the indication received from the mobile network. In case of a general indication indicating that alternative access technologies may be available, but failing to specify the technologies available, all short-range radios of the terminal may be activated, unless the user has given specific instructions contrary to this. The short-range radios may be activated in succession, one radio at a time. Having performed the search for one radio, the terminal controls the radio to a power save mode and activates the next short-range radio to perform the search for this radio. If the indication received from the mobile network specifies the alternative access technologies/technology available, only the short-range radio(s) corresponding to the technologies/technology in question need be activated.

In another embodiment, the indication received from the mobile network includes a pointer to a network address from where information concerning local services may be retrieved. This information may be retrieved through the mobile network, for example.

In this way, the terminal receives, without user interaction, network-specific information from the short-range wireless network(s) available in the neighborhood. Based on the information received, the terminal compiles a service list describing the services provided by the networks. The list is presented to the user of the terminal, and the user may then decide whether any of the services is accessed, i.e. whether any of the short-range radios is activated. Alternatively, the terminal may automatically activate one of the short-range radios, especially if the user has in advance defined the conditions on which this may be done.

Thus one embodiment of the invention is the provision of a method for discovering services for a wireless multimode terminal with a plurality of operation modes. The method includes sending an indication to a multimode terminal operably connected to the mobile network, the indication indicating that services may be locally available via at least one short-range wireless network and receiving the indication in the multimode terminal. The method further includes collecting, based on the indication, service information about services available for the multimode terminal through at least one short-range radio interface of the multimode terminal, and compiling, based on the service information collected, a service list describing at least one service available locally through the at least one short-range radio interface. As discussed above, the service information may be collected through any one or more of the radio interfaces of the terminal. As is also obvious from the above, a short-range radio interface here refers to a radio interface other than the radio interface with the mobile network.

In another embodiment, the invention provides a system for discovering services for a wireless multimode terminal. In a mobile network, the system includes indication means for sending an indication to a multimode terminal operably connected to the mobile network, the indication indicating that services may be locally available for the multimode terminal via at least one short-range wireless network. In a multimode terminal the system includes a first radio interface with a mobile network and at least one short-range radio interface, and reception means for receiving the indication through the first radio interface. In the multimode terminal the system further includes information collection means, responsive to the reception means, for collecting service information about services available via at least one of the at least one short-range wireless network, and service indication means for compiling a service list based on the service information collected, the service list describing at least one service available via the at least one of the at least one short-range wireless network.

In a further embodiment, the invention provides a wireless multimode terminal. The terminal includes similar means as the above-described system includes in a multimode terminal.

BRIEF DESCRIPTION OF THE DRAWINGS

In the following, the invention and many of its embodiments are described more closely with reference to the examples shown in FIG. 1 to 4 in the appended drawings, wherein:

FIG. 2 is a flow chart illustrating the operation of a multimode terminal in one embodiment of the invention;

FIG. 4 illustrates one embodiment of the service list compiled for the user.

DETAILED DESCRIPTION OF THE INVENTION

Figure 1:
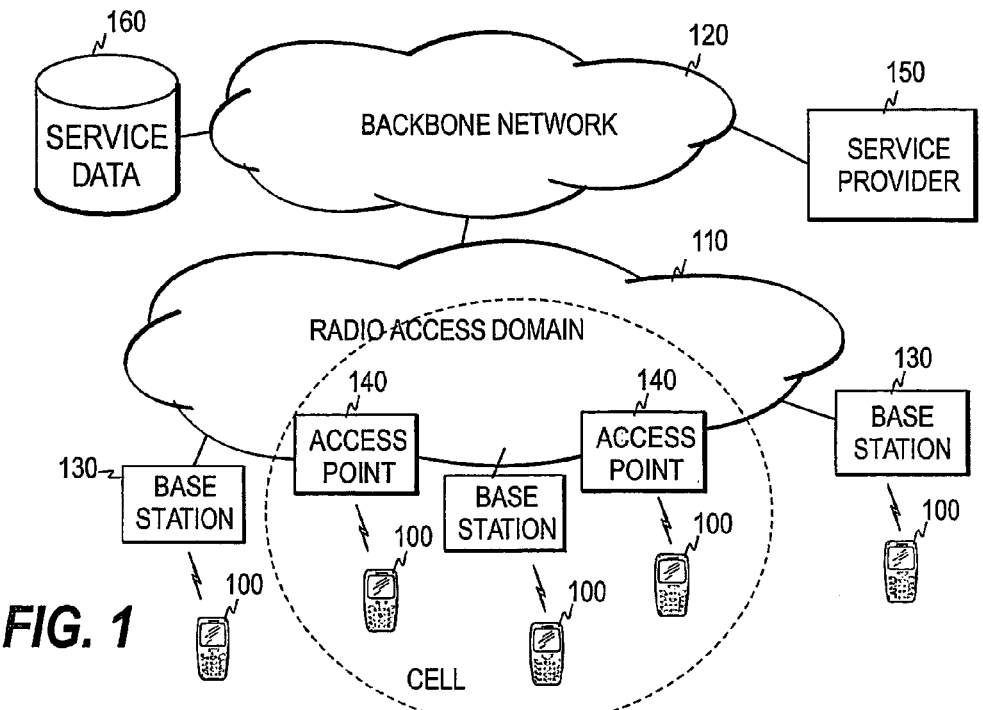
FIG. 1 illustrates an example of a communication environment in which a terminal of the invention may operate.

FIG. 1 shows an example of a general communication environment in which the present invention can be applied. The communication environment comprises three interacting domains: user equipment 100, an access domain 110 comprising several radio-access networks, and a backbone domain 120 comprising a core network.

The above communication environment includes a mobile network and a plurality of short-range wireless networks. The mobile network may be based on the UMTS (Universal Mobile Telecommunication System) or on the GSM (Global System of Mobile communications) network architecture, for example. The short-range wireless networks may in turn be based on various technologies, such as Wireless Local Area Network (WLAN), Bluetooth or Ultra Wide Band (UWB) technology. The access domain thus includes base stations 130 (or node B elements) of the mobile network and access points 140 of the short-range wireless systems. The backbone domain includes a plurality of service providers 150, and it may also include a special service database 160 for the mechanism of the invention, as discussed below.

The User Equipment is shown as a plurality of mobile terminals 100. In this context, it is assumed that the terminals are multimode terminals, i.e. terminals that have at least two operation modes: an operation mode in which a terminal is capable of communicating with the mobile network and at least one other operation mode, in which a short-range radio of the terminal is active. Generally, the terminals typically have different states with respect to each operation mode, and the states allowed concurrently depend on the implementation of the terminal. However, normally the "mobile network mode" does not exclude the use of a "short-range mode", and vice versa.

In the present invention, the mobile network is utilized to carry an indication from a base station to the mobile terminals within the coverage area (i.e. cell) of the base station, if the relevant cell includes alternative access technologies. The indication may thus indicate that at least one short-range network service is available for users moving within the cell in question.

FIG. 2 illustrates one embodiment of the operation of a multimode terminal for discovering local services. When a terminal enters the cell or is switched on in a cell where local services are available, the terminal receives the indication (step 200). In response to the reception of the indication, the terminal starts to search for short-range radio networks through its short-range radio interfaces. As shown in FIG. 2, the search may be performed for one short-range radio interface at a time. The terminal thus activates the first short-range radio (step 201) and searches for networks corresponding to that radio technology (step 202). If a compliant network is found, the terminal receives network-specific information from the said network and stores the information. Having received information from one or more networks, the terminal inactivates the radio (step 207), i.e. the short-range radio enters a power save state. If the terminal comprises other short-range radios, which the received indication may have concerned, the terminal performs the above steps for each radio at a time. In other words, the terminal activates a short-range radio, searches for one or more compliant networks, receives and stores network-specific information when a network is found, and controls the radio to a power save state after the search is completed for that radio. When networks have been searched for all short-range radios of the terminal, the terminal compiles a service list based on the information received (step 211). The list may be tailored according to user preference data stored in the terminal. The list is then presented to the user (step 212), after which the user may decide whether any of the services is accessed, i.e. whether any of the short-range radios is activated.

The mobile network thus gives the terminals an indication of alternative technologies available for accessing services locally. In response to the indication, the terminal searches for compatible networks and compiles a list of services available through the said alternative technologies. Based on the list, the user may decide whether any of the services is accessed. The number of short-range radios activated in response to the indication depends on the content of the indication and on the implementation of the terminal. If the indication is a general indication informing of the possibility of one or more alternative access technologies, all short-range radios of the terminal may be activated, unless otherwise instructed by the user. If the indication includes specific information about the technologies available, one or more radios corresponding to these technologies may be activated.

The implementation of the search for a compliant network may depend on the technology in question. In WLAN systems, for example, the terminal may use active or passive scanning in order to detect the access points in the region. In active scanning, the terminal sends, a message called a Probe on each channel. When an access point receives a Probe message, it returns a Probe Response to the terminal. In passive scanning, the terminal finds the network simply by listening for the beacon messages, which are periodically broadcast by each access point. Utilizing the above-described active or passive scanning, the terminal scans the channels and examine the information transmitted in the beacon frames or in the Probe Response frames, which contain information about the properties of the access point. This information typically includes information that may be directly used for the service list, such as the network identity.

Figure 3:
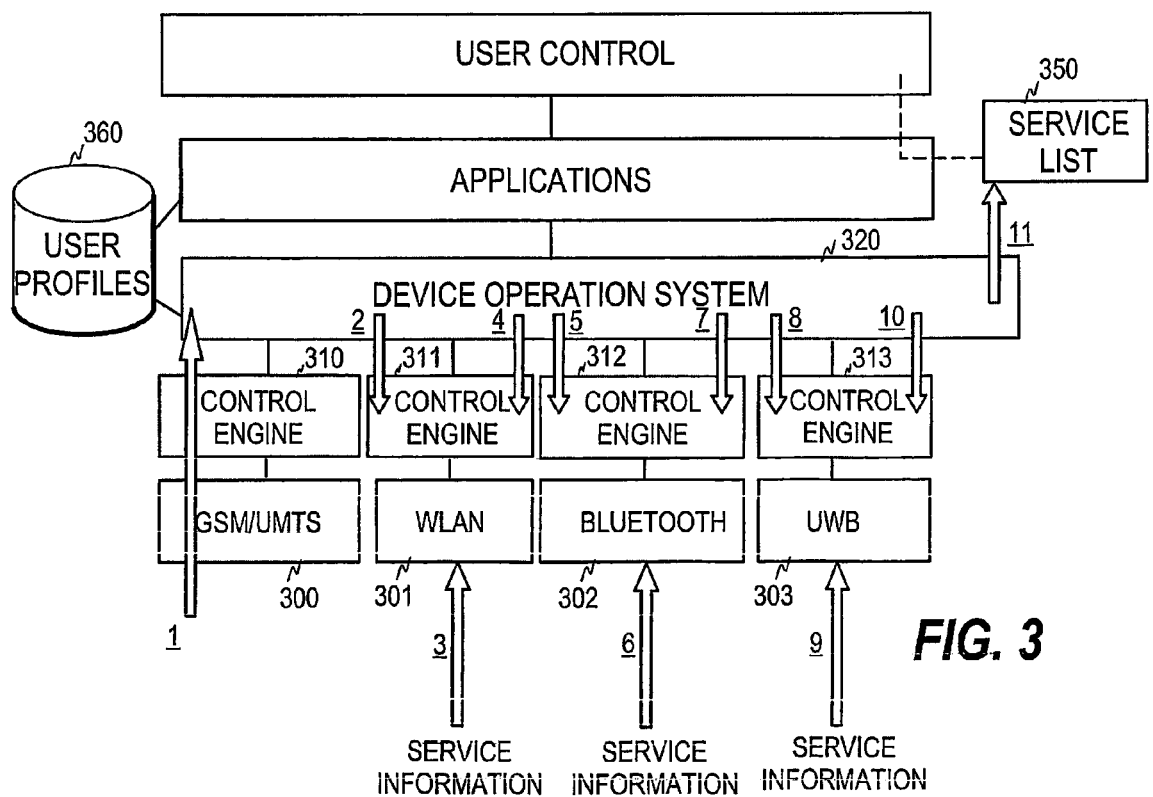
FIG. 3 illustrates the architecture of one embodiment of a multimode terminal of the invention.

FIG. 3 illustrates an example of the architecture of a multimode terminal. It is assumed here that the terminal comprises an interface 300 to the mobile network and three short-range radio interfaces, such as a WLAN interface 301, a Bluetooth interface 302, and a UWB interface 303. Each radio interface is controlled by a corresponding control engine 310 to 313 that provides, for example, the Medium Access Control (MAC) services in the corresponding operation mode. An operation system layer 320 controls the different control engines and the states of the terminal. The operation system layer receives the selections made by the user in an application and controls the state and operation of the terminal accordingly.

The arrows provided with underlined numbers illustrate the above-described steps for compiling a service list 350 for the user, assuming that the search is performed for each short-range radio, one radio at a time. An indication of a possible short-range network is received by the operation system layer through the mobile network interface (arrow 1). The operation system layer then controls the operation of the terminal so that compliant networks are searched for through each of the short-range radio interfaces. Arrow 2 represents the activation of the WLAN interface, arrow 3 the reception of network-specific information from at least one WLAN network, and arrow 4 the inactivation of the WLAN interface. Arrows 5 to 7 and 8 to 10 represent the corresponding events for the Bluetooth and UWB interfaces, respectively. Based on the information received, the operation system layer compiles the service list (arrow 11). The user may utilize the list through an application. As discussed below, user preference data (user profiles), stored in a user database 360, accessible by the user, may also control the operation of the terminal during service discovery.

Upon receiving an indication from the mobile network, the terminal thus searches for compatible short-range radio networks without user interaction, and then compiles a service list based on the information received from the different networks detected. In this way, the different radio technologies can be hidden from the user. FIG. 4 illustrates an example of the service list displayed to the user of the terminal. As shown, in its basic embodiment the list may include only names of the service providers or services available locally.

However, the list may be hierarchical with the top level showing only the services, while the information beneath a certain service or service provider may include various items, such as the radio technology in question, related to the service or service provider. The radio technology corresponding to a service may also be indicated by attaching a symbol and/or a color to a service shown, the symbol and/or color indicating the technology in question. As discussed below, the information for the service list may be received entirely in the network-specific information received, or the received indication or network-specific information may include data, such as addresses, which may be utilized to obtain the desired information for the service list.

The terminal may also store user preference data, which may determine the operation of the terminal at different stages of the method. First, the user preference data may define the radio technologies for which a network (i.e. an access point) is searched for when an indication is received from the mobile network. Second, the preference data may determine the way the service list is compiled. For example, the services available through a certain technology may always be on top of the list. The user preference data may also include criteria that determine the information taken to the service list. The application may also interact with the user in order to display the list in various forms preferred by the user. Various selection or sorting criteria, such as the price or the data rate, may be displayed to the user, and the user may select one or more criteria for modifying the service list. The terminal may also be provided with a learning system that compiles the service list according to the behavior of the user.

The indication may be introduced into the system information transmitted from the base stations to the terminals of the mobile network. Since the terminals listen to the system information transmitted by the base stations, they may detect if the system information includes an indication of a short-range wireless network. The short-range radios may thus be in a power save state as long as an indication is not received from the mobile network.

In order to carry the indication within the system information from the base station to the mobile terminals, new system information messages may be defined to inform the mobile terminals of short-range wireless networks. In a GSM/GPRS system, one or more new system information messages may be introduced in addition to the current types 1 to 14, for example. In a WCDMA system, one or more new system information blocks may be defined, correspondingly, in addition to the current system information blocks 1 to 18.

In the system information elements, the indication may be given in various ways. Although a basic indication may be given with only one bit indicating that an alternative technology is available or is not available, the indication may include additional information (several bits). Generally, this additional information may include any service-related information, such as instructions for accessing the services or for getting further information about the services. The following table shows an example of three different information elements, concerning three different technologies, respectively, for carrying information about corresponding networks to the mobile terminals.

| System information element | Length |
| --- | --- |
| Neighbor WLAN description | 4 to 16 bits |
| Neighbor Bluetooth description | 4 to 16 bits |
| Neighbor UWB description | 4 to 16 bits |

In the above example, the length of the system information elements is assumed to be between 4 and 16 bits. However, the length is not restricted to this range but may vary in various ways, depending on the information to be carried from the mobile network to the terminals. At least some of the bits available in the information elements may be used to indicate the type of the short-range wireless network available, for example. As to the WLAN, a 2-bit combination, for example, may be used to define whether there is a network compliant to the IEEE 802.11b standard, a network compliant to the IEEE 802.11a standard, a combined network compliant to both standards, or no WLAN network at all. Some of the bits may also be used to inform the terminal about the transmit power allowed in the terminal, or about a channel to be selected, for example. Furthermore, some of the bits may be used to indicate the network identities to the terminals, i.e. the service providers that are available for the users.

The indication may also contain, for example, an address, such as an IP address, from which the terminal may obtain further information about the short-range wireless services available locally, such as a list of service providers. When receiving this address the terminal may either retrieve the information automatically, or the user may be queried whether the information is to be retrieved to the terminal. In a further embodiment, the terminal may first examine whether the indication contains a network address pointing to the source of service information, and if such an address is not found, it attempts to detect at least one short-range network by activating at least one short-range radio interface.

The short-range access points may be operated by the operator of the mobile network or by one or more local operators. Each local operator may send information about its services to the mobile network operator, which may maintain a service database in the network (cf. service database 160 in FIG. 1). The information collected to the service database is then used for the indications sent in the system information.

Although the invention was described above with reference to the examples shown in the appended drawings, it is obvious that the invention is not limited to these, but may be modified by those skilled in the art without departing from the scope and spirit of the invention. For example, the terminal may search for compatible access points simultaneously through several short-range radio interfaces, provided that the implementation of the terminal allows that (dedicated MAC entities for different radio interfaces) and that no excess interference is caused to any of the interfaces.

The invention claimed is:

1. A method comprising:
receiving, from a mobile network, an indication at a multimode terminal operably connected to the mobile network, the indication indicating that services may be locally available via at least one short-range wireless network, wherein the indication comprises multiple bits, which in combination of the multiple bits indicate one or more of the following: type of the at least short-range wireless network, transmit power allowed in the multimode terminal, a channel to be selected by multimode terminal, an IP address from which the multimode terminal may obtain further information about the locally available services, and a network address pointing to a source of service information;
based on the indication, collecting service information about services for the multimode terminal available through at least one short-range radio interface of the multimode terminal, wherein said collecting service information comprises: the multimode terminal activating the at least one short-range radio interface, searching for one or more compliant networks, and receiving and storing network-specific information if a compliant network is found, and inactivating the at least one short-range radio interface if no compliant network is found; and
based on the service information collected, compiling a service list describing at least one service available through the at least one short-range radio interface.

2. The method according to claim 1, wherein the collecting comprises:
attempting to detect at least one of the at least one short-range wireless network through at least one short-range radio interface of the multimode terminal; and
gathering the service information through the at least one short-range radio interface.

3. The method according to claim 2, wherein the attempting and gathering are performed for one short-range radio interface at a time.

4. The method according to claim 3, further comprising controlling the multimode terminal to a power save state with respect to a short-range radio interface after service information is collected through that short-range radio interface, or when no network is detected through that short-range radio interface.

5. The method according to claim 2, wherein the attempting includes attempting to detect short-range wireless networks corresponding to all short-range radio interfaces of the multimode terminal.

6. The method according to claim 1, further comprising:
storing user preference data in the multimode terminal;
based on the preference data and the service information collected, selecting one short-range wireless network; and
establishing communications with the short-range wireless network selected.

7. The method according to claim 1, wherein the indication received from the mobile network includes instructive information for the collecting of said service information.

8. The method according to claim 7, wherein the instructive information comprises at least one network address.

9. The method according to claim 8, wherein the service information is collected through a radio interface by which the multimode terminal is operably connected to the mobile network.

10. The method according to claim 8, wherein the collecting comprises:
extracting the at least one network address from the indication; and
gathering the service information based on the at least one network address.

11. The method according to claim 8, wherein the network address is an internet protocol address.

12. The method according to claim 7, wherein the instructive information indicates at least one short-range radio interface for each service available locally.

13. The method according to claim 12, wherein the collecting comprises:

attempting to detect at least one of the at least one short-range wireless network through at least one of the at least one short-range radio interface indicated by the instructive information; and gathering the service information through the at least one of the at least one short-range radio interface.

14. The method according to claim 1, further comprising presenting the service list to a user of the multimode terminal.

15. The method according to claim 14, wherein the compiling comprises compiling the service list according to user preference data.

16. The method of according to claim 14, wherein the presenting comprises presenting a required connectivity standard for each of the at least one service.

17. The method according to claim 14, further comprising querying the user of the multimode terminal when any of the at least one service is to be accessed.

18. The method according to claim 1, wherein the service list comprises service providers corresponding to the at least one service.

19. The method according to claim 1, wherein the receiving comprises receiving the indication as part of system information sent from the mobile network.

20. The method according to claim 1, further comprising maintaining a service database in the mobile network, the service database comprising service-related data for the indication.

21. The method of claim 1, further comprising inactivating the at least one short-range radio interface if the searching is complete.

22. An apparatus comprising:
a first radio interface operably connectable to a mobile network;
at least one short-range radio interface,
a receiver configured to receive an indication, from the mobile network, through the first radio interface, the indication indicating that services may be locally available for the apparatus via at least one short-range wireless network, wherein the indication comprises multiple bits, which in combination of the multiple bits indicate one or more of the following: type of the at least short-range wireless network, transmit power allowed in the apparatus, a channel to be selected by the apparatus, an IP address from which the apparatus may obtain further information about the locally available services, and a network address pointing to a source of service information; and a controller configured to collect service information about services available via at least one of the at least one short-range wireless network, wherein said collecting service information comprises: activating the at least one short-range radio interface, searching for one or more compliant networks, and receiving and storing network-specific information if a compliant network is found, and inactivating the at least one short-range radio interface if no compliant network is found; and compile a service list based on the service information collected, the service list describing at least one service available via the at least one of the at least one short-range wireless network.

23. The apparatus according to claim 22, wherein the receiver is configured to receive the indication as part of system information sent to terminals in the mobile network.

24. The apparatus according to claim 22, wherein the indication comprises instructive information for the collecting of said service information.

25. The apparatus according to claim 22, wherein the service list comprises information about a connectivity standard for the at least one service.

26. The apparatus according to claim 22, wherein the apparatus is configured to attempt to detect the at least one of the at least one short-range wireless network in response to the indication.

27. The apparatus according to claim 26, wherein the apparatus is configured to activate one short-range radio interface at a time.

28. The apparatus according to claim 27, wherein the apparatus is further configured to control an activated short-range radio interface to a power save state after service information is collected through the activated short-range radio interface or when no network is detected through the activated short-range radio interface.

29. The apparatus according to claim 22, wherein the apparatus is configured to retrieve the service information from a network address included in the indication.

* * * * *